April 15, 1969 J. BOILEAU 3,438,309
PNEUMATIC SPRINGS
Filed Nov. 30, 1966

INVENTOR
JACQUES BOILEAU
BY
HIS ATTORNEYS

United States Patent Office 3,438,309
Patented Apr. 15, 1969

3,438,309
PNEUMATIC SPRINGS
Jacques Boileau, Clermont-Ferrand, Puy-de-Dome, France, assignor to Compagnie General des Etablissements Michelin raison sociale Michelin & Cie, Clermont-Ferrand, Puy-de-Dome, France
Filed Nov. 30, 1966, Ser. No. 597,976
Claims priority, application France, Dec. 4, 1965, 41,109
Int. Cl. F01b 19/00; F16j 3/00; B60g 11/26
U.S. Cl. 92—103
9 Claims

ABSTRACT OF THE DISCLOSURE

A pneumatic spring includes a flexible diaphragm defining part of an enclosure within which air under pressure is contained. The diaphragm includes a rolled-over or folded part which rolls and unrolls to effect a spring-like action. The rolled-over part contains a reinforcement of one or two plies of steel cables. The cables have a modulus of elasticity, when subjected to a stretching force equal to one-tenth their breaking load, of between about 500 and 5000 kg./mm.$^2$. The cables comprise a plurality of steel wires, each wire not exceeding 0.12 mm. in diameter.

---

This invention relates to improvements in vehicle suspensions, and more particularly to pneumatic or air springs for passenger cars, vans, buses, trucks, and the like.

Air springs usually consist of a plunger or piston or other support mounted on the frame of a vehicle, a similar type of support mounted on the wheel mount or axle of the vehicle and one or more diaphragms or bellows mounted between the supports to effectively spring and suspend the vehicle. Air is supplied to the air springs by means of an air tank or reservoir and a compressor to maintain a desired air pressure in the air spring or to vary the pressure therein, depending upon the vehicle load.

A particularly effective type of spring includes a diaphragm having an outer wall and an inner sleeve portion at one or both ends of the outer wall joined to the outer wall by an arcuate portion, thereby being a single U or a double U shape in section through one side of the diaphragm. The supports or plungers are connected with the inner end or ends of the sleeves and as the load on the air spring varies, the inner sleeve or sleeves telescope to a greater or lesser extent relative to the outer wall of the diaphragm, thereby varying the pressure within the diaphragm and producing the spring-like action sought and adapting the spring to widely varying loads and enabling a wide regulation of the amplitude of response to varying loads.

During the inward and outward movement of the sleeve or sleeves, the curved or arcuate portion moves in a rolling and unrolling fashion and thus is subjected not only to the internal air pressure but flexing, compressing and stretching In order to reduce wear on and damage to the curved or arcuate portion or portions, its curvature should be on as large a radius as possible This is particularly important when the diaphragm is reinforced with ply fabric in order to withstand the stresses exerted thereon when used on heavy duty vehicles. However, limits to the radius of curvature of the curved or arcuate portion of the diaphragm are imposed by space limitations and operating conditions. In the first place, the space available for mounting an air spring is usually limited so that the external diameter of the diaphragm also is limited. The diameter of the internal sleeve or sleeves cannot be reduced very much for the reason that the effective diameter of the air spring is also reduced. The effective diameter is approximately equal to the mean of the diameters of the outer wall of the diaphragm and the diameter of the sleeve. Inasmuch as the outer diameter must remain constant, the effective diameter decreases as the radius of curvature of the curved or arcuate portion increases and increases as the radius of curvature decreases. In order to provide adequate load-bearing capacity, the effective diameter should be as large as possible and accordingly, the radius of curvature of the curved ends of the diaphragm is further limited by the effective diameter.

Another disadvantage associated with a large radius of flexing curvature is the accentuation of deformation of the diaphragm as the sleeve moves in and out and the arcuate portion rolls and unrolls. If the radius of curvature is increased, the diameter of the sleeve or sleeves must be decreased, and inasmuch as the unrolling movement of the arcuate portion brings portions of the sleeve or sleeves more or less to the same diameter as the outer wall of the diaphragm, there is a tendency for the diaphragm to crumple or wrinkle and be damaged as it telescopes into and out of the outer wall. As a consequence, any compromise between the need for an internal sleeve with as large a diameter as possible and a radius of curvature of the arcuate portion as large as possible retains some of the disadvantages of both and results in a less than satisfactory operating life for such an air spring.

In accordance with the present invention, the diaphragms for air springs are modified in their structure so that they have less bulk and are far more flexible than conventional air springs while maintaining a high overall strength and thus enabling the diaphragm to be flexed under service conditions on much shorter radii of curvature than was heretofore possible.

More particularly, in accordance with the present invention, the diaphragm is reinforced with highly flexible metallic cables or cords which are arranged in the diaphragm in such a manner as to impart the flexibility required to enable it to be flexed on a very short radius of curvature without breaking of the cables, delamination of the cables and the sheathing elastomer, or wrinkling or crumpling the diaphragm.

In a typical air spring diaphragm embodying the invention having a half section in the form of a U or double U, reinforcement is obtained by means of steel cords or cables having a modulus of elasticity between about 500 to 5000 kg./mm.$^2$, and optimally between about 1000 and 1500 kg./mm.$^2$. The modulus of elasticity referred to above corresponds to the equation $$\frac{F}{S} = E \frac{dL}{L}$$

in which E is the modulus of elasticity, S and L designating, respectively, the initial cross-section and length of a cable specimen, $dL$ being its elongation when the specimen is subjected to a force F equal to one-tenth of the breaking load of the cable.

The modulus of elasticity of the steel cords or cables used in the air spring diaphragm according to the present invention is much lower than the modulus of elasticity of steel cords or cables which are used for reinforcing the treads of tire casings and the like. Such tire reinforcing cables have a modulus of elasticity on the order of 20,000 kg./mm.$^2$ and are composed of wires about 0.15 to 0.18 mm. in diameter. Tire reinforcing cables of the modulus indicated are not suitable for reinforcing air spring diaphragms of the type to which this invention relates.

Cords or cables of the type used in the air spring diaphragm according to the invention are composed of very small diameter steel wires, that is, wires having a diameter not exceeding 0.12 mm. The finess of these wires is decisive in providing the required flexibility of the diaphragm. These wires may be assembled into cables in a manner described more particularly in U.S. Patent No. 3,090,190.

By utilizing such flexible metal cables in the diaphragm, the diaphragm can be bent or flexed on very small radii of curvature without being limited by a resistance to elongation which is either too low, resulting in excessive deformability of the diaphragm or in having to increase the number of layers of reinforcing cables and therefore the thickness of the wall of the membrane, or too high which would cause excessive stresses under flexing and lead to the delamination of the cables and the surrounding elastomer.

In accordance with the invention, the cable reinforcement of the diaphragm can consist of one or two layers of cables although more than two can be used if the cables are suitably located in the diaphragm. When one layer of cables is used, they will be arranged to extend generally in the meridian planes of the diaphragm. When two layers of cables are used, the cables of one ply will cross the cables of the other ply and will be inclined to the meridian planes of the diaphragm at an angle between about 20° and 60°, depending upon the region or zone of the diaphragm in which they are located. In the portion of the diaphragm forming its outer wall, the cables will have an angle close to 54°. One advantage is derived from the use of crossing layers of cable plies for, in the zone of flexing of the diaphragm, the angularity of the cables, in effect, increases their radius of curvature during flexing as compared with the actual radius of curvature of the diaphragm. As a matter of fact, a diaphragm which is reinforced with two crossing layers of steel cables of the type referred to above can be flexed on a radius of curvature as short as 10 mm. without weakening or damaging the diaphragm. Naturally, larger radii of curvature can be provided if the size of the air spring permits. Also by positioning the cables at varying angles within the diaphragm, even in the case of meridianally arranged cables, they can be arranged substantially contiguous in the region of minimum diameter of the diaphragm (the sleeve or sleeves) without being spaced too far apart for satisfactory reinforcing purposes in the region of maximum diameter, that is, the outer wall of the diaphragm. In all cases, by reducing the spacing between the maximum and minimum diameters of the diaphragm, that is, between the outer wall of the diaphragm and the sleeve or sleeves which extend into the outer wall, the density of the cords varies within narrower limits per unit of surface area than with larger radii of curvature, so that the diaphragm can be made to function under more rational conditions by reducing the difference in the spacing between the cables in the more highly reinforced small diameter zone and the cables in the less reinforced outer zone.

It is customary to apply an outer metal collar or shield around the outer wall of such a U-shaped or double U-shaped diaphragm and difficulties have been encountered in the past in preventing this collar from sliding relative to the diaphragm. In accordance with the present invention, the outer wall of the diaphragm is provided with small, generally cylindrical, protuberances which engage in complemental holes in the shield and due to the pressure of the air within the diaphragm secure the shield tightly against movement relative to the wall of the diaphragm.

For most effective operation and prolonged life of the diaphragm by reduction of rubber fatigue, it is desirable to mold and vulcanize it in a shape or form it will assume in an average position, that is, in the position which permits movements of substantially equal amplitudes in the direction of extension and the direction of compression. An air spring diaphragm of double U half-section assumes normally, in a relieved condition, a height about three-fourths as great as the length of the diaphragm from bead to bead. With such a relation, the stress ratio of the rubber is reduced to a minimum and the rubber in the diaphragm should be stabilized in this relation during vulcanization for optimum results.

For a better understanding of the present invention, reference may be had to the accompanying drawings, in which.

Figure 1:
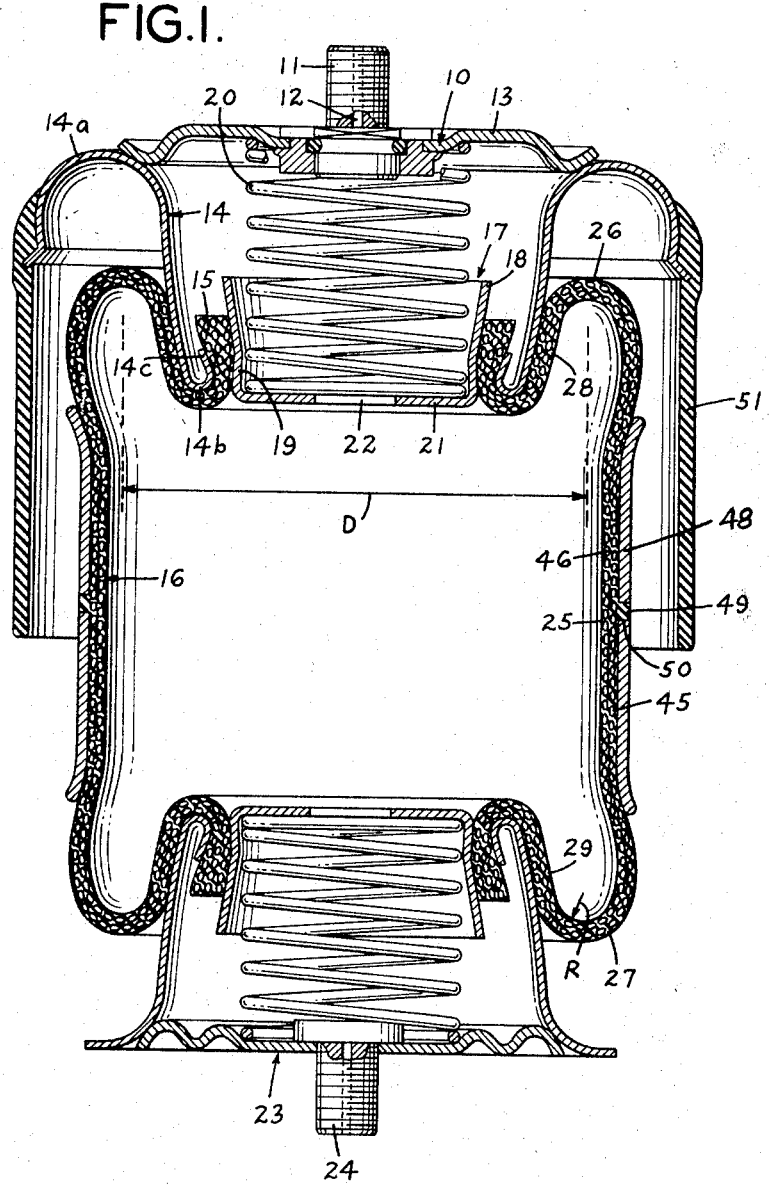
FIGURE 1 is a view in section illustrating an air spring of the type embodying the present invention in its extended or no or light load conditions.

As illustrated in FIGURE 1 of the drawings, an exemplary form of air spring includes a head or support 10 adapted to be attached, for example, to a vehicle frame by means of a centrally located threaded stud 11 or a plurality of studs provided with an air passage 12 by means of which air can be admitted to the air spring from an air tank and an air compressor on the vehicle (not shown). The support 10 includes a dish-like plate 13 to which the stud is affixed by welding or in any other suitable way. A casing 14 of annular form and, as illustrated, having generally S-shaped radial cross-section is welded to the edge of the plate 13. The upper curved portion 14a is formed on a relatively large radius of curvature while the opposite end 14b is formed on a shorter radius of curvature and includes an upwardly and outwardly flared annular rim 14c for engaging the outer surface of a generally triangular bead 15 on the diaphragm 16 of the air spring. The bead 15 is secured to the support 10 by means of a cup-shaped plunger 17 having a truncated upper portion 18 and a cylindrical or slightly oppositely truncated lower portion 19 which engages the inside of the bead 15 and clamps it against the flange 14c. A coil spring 20 interposed between plate 13 and the base 21 of the plunger 18 forces the plunger into the bead. A centrally located hole 22 in the base of the plunger 18 equalizes the air pressure on the opposite sides of the plunger.

A support 23, similar to that described above, engages the lower end of the diaphragm 16 and is adapted to be connected to the wheel mount or axle by means of a threaded stud 24 or the like.

Figure 2:
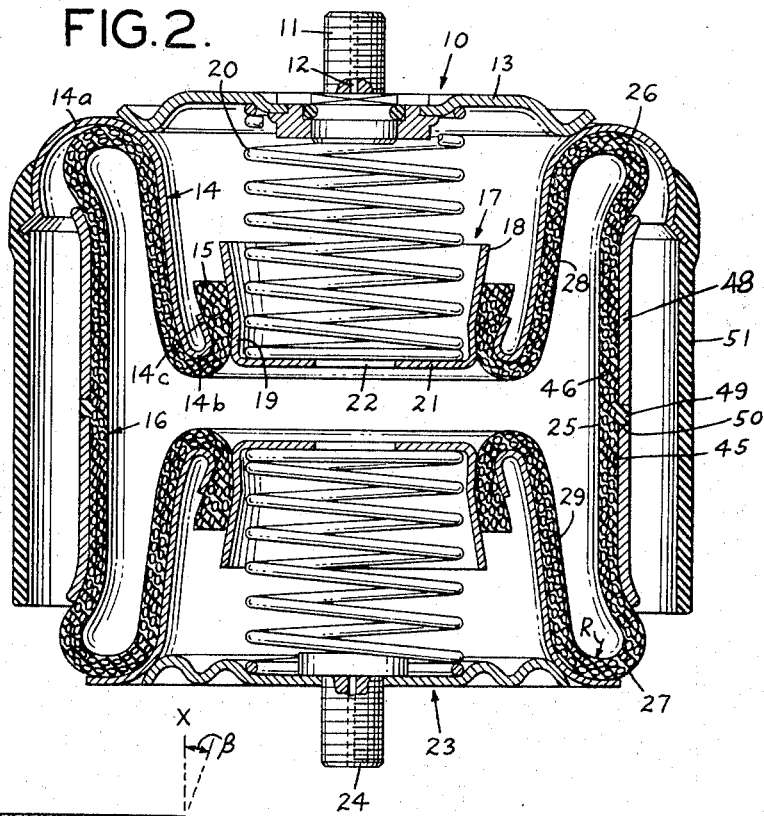
FIGURE 2 is a view in section showing the spring in a compressed or loaded condition.
Figure 5:
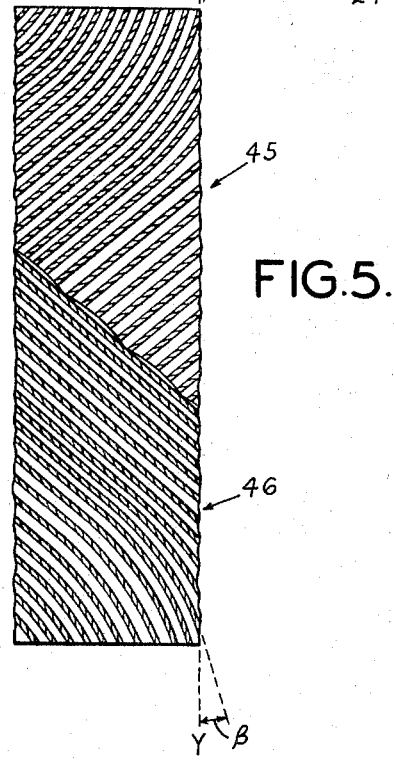
FIGURE 5 is a developed view in section illustrating the relation of plies of cables in a diaphragm of the type embodying the present invention.

As best shown in FIGURE 2, the diaphragm 16 has an outer, generally cylindrical wall 25 and inwardly curved or bent portions 26 and 27 at opposite ends thereof merging into inwardly extending sleeves 28 and 29 which are reversely bent at their ends so that the beads 15 extend outwardly. A section through one side of the diaphragm is of generally double U shape, the bases of the U shapes being formed by the arcute portions 26 and 27. Upon comparison of FIGURES 1 and 2, it will be seen that the arcuate portions 26 and 27 roll and unroll as the two supports 10 and 23 move toward and away from each other, thereby subjecting the membrane to flexing, compressing and stretching at these zones. As indicated above, the radius of curvature R should be as small as possible in order to make the effective diameter D shown in FIGURE 1 as large as possible, within the limits imposed by the space for mounting the air spring, to obtain maximum load-carrying capacity for the cross-section of the spring.

Figure 3:
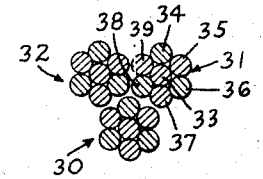
FIGURE 3 is a cross-sectional view of a cable of the type used for reinforcing the diaphragm of the air spring.
Figure 4:
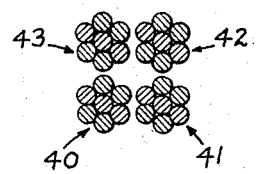
FIGURE 4 is a cross-sectional view of a modified form of cable for reinforcing the diaphragm.

In accordance with the invention, the radius of curvature of the arcuate portions 26 and 27 can be materially reduced by reinforcing the membrane with one or more plies of highly flexible steel cables. As shown in FIGURE 3, each cable may consist of three strands 30, 31 and 32, each consisting of a central single wire 33 around which are twisted six wires 34, 35, 36, 37, 38 and 39. The three strands also are twisted together as disclosed in U.S. Patent No. 3,090,190. In order to impart the desired strength and flexibility to such a cable, the individual wires 33 to 39 should have a diameter not exceeding about 0.12 mm. A cable of the type described formed of wires of 0.12 mm. diameter has a modulus of elasticity of approximately 1340 kg./mm.$^2$ and under a load of 5 kg., it has an elongation of 2.1%. Its breaking load is 47 kg. Such a cable is much stronger than a textile fabric cord of the same diameter and at the same time it is much more flexible and capable of greater elongation than the types of steel cords or cables used heretofore for the reinforcement of tire casings. The ability of this type of cable to flex and to stretch renders the diaphragm strong and highly flexible and enables it to be flexed or bent on a very short radius of curvature without separation of the cables from the elastomer and without breaking of the cables.

Another type of cable which is suitable for reinforcing of the diaphragm consists of four strands 40, 41, 42 and 43 twisted together, each strand consisting of a single central wire surrounded by a layer of six wires, each having a diameter of 0.09 mm. The cross-sectional diameter of this cord is the same as that of the cord or cable shown in FIGURE 3 and has a modulus of elasticity of approximately 1125 kg./mm.$^2$. Under a load of 5 kg., it stretches or elongates 2.5% and it breaks under a load of 48 kg. While a single layer or ply of such cords may be used for reinforcing the diaphragm 16 with the cords laid meridianally of the diaphragm and more than two plies of cables can be used, the best results are obtained with two plies 45 and 46 of such cables crossing each other and laid at a bias at an angle between about 20° and 60° to to the meridian direction XY of the diaphragm. When the cables are laid at an angle of about 54° to the meridian plane, the angle is less than 54° value in the internal sleeve portions 28 and 29 and approaches an angle β close to 20°. It will be seen, accordingly, that at the zones of bending 26 and 27, the cables extend at an angle and thus when flexed actually are flexed on a radius of curvature greater than the actual cross-sectional curvature of the curved and flexing portions 26 and 27 of the diaphragm. This arrangement of the cables enables the radius of the flexing portions 26 and 27 to be reduced even further, thereby increasing materially the effective diameter D of the air spring and increasing its load-carrying capacity without at the same time introducing damaging stresses into the diaphragm during its flexing and rolling and unrolling action.

As indicated in FIGURES 1 and 2, the outer wall of the diaphragm 16 may be restrained against bulging by means of a metal collar or sleeve 48 which engages the outer wall between the zones 26 and 27 of flexing of the diaphragm. This sleeve is fixed against movement relative to the outer wall of the diaphragm by providing the diaphragm with a plurality, usually three, of small cylindrical projections 49 which engage tightly in correspondingly located holes 50 in the sleeve and are retained therein by the air pressure in the diaphragm.

Also, if desired, the air spring may be provided with a rock shield consisting of a rubber collar 51 which is attached at its upper end to the annular member 14 and extends downwardly a sufficient distance to prevent flying stones and the like from wedging between the air spring diaphragm and the shield.

The provision of steel cable reinforcements as indicated above, enables the diaphragm to be made of smaller cross-sectional thickness and enhances its flexibility while permitting a sufficient amount of elongation of the diaphragm to enable it to flex without over-stressing and causing rupture of the diaphragm.

The use of cables formed of small diameter wires of the order of those described above assures the proper reinforcement of the diaphragm so that a stronger and more effective load-carrying medium is provided within the confines of the space available for mounting the air spring on the vehicle.

It will be understood that diaphragms of different shapes and configurations than that of the exemplary embodiment may be similarly reinforced. Thus, instead of a double U formation, the diaphragm may be of a single U in which the outer wall is connected directly to a support of a generally cylindrical configuration while the lower inturned or sleeve-like portion is connected to the plunger-like support of the type generally described above. Similar reinforcements may be used in bellows-type air springs and air springs of different sizes may also be provided, depending upon requirements.

I claim:

1. A pneumatic spring comprising a flexible diaphragm having an outer wall portion, an inner sleeve portion and an arcuate connecting portion of small radius of curvature therebetween, and a reinforcement of at least one ply of steel cables extending through said arcuate connecting portion, said cables having a modulus of elasticity when subjected to a stretching force equal to one-tenth their breaking load of between about 500 and 5000 kg./mm.$^2$ and comprising a plurality of steel wires, each wire not exceeding 0.12 mm. in diameter, and said connecting portion rolling and unrolling during operation of said spring so that portions of said diaphragm lying in said connecting portion in a given condition of said spring pass alternately into said inner sleeve portion and said outer wall portion.

2. The spring set forth in claim 1 in which said modulus of elasticity is between about 1000 and 1500 kg./mm.$^2$.

3. The spring set forth in claim 1 in which said reinforcement consists of a single ply of said cables disposed in the meridian planes of said diaphragm.

4. The spring set forth in claim 1 in which said reinforcement comprises two plies of said cables, the cables in one ply crossing the cables in the other ply and forming angles with the meridian planes of said diaphragm between about 60° and 20°.

5. The spring set forth in claim 4 in which the angle of the cables in the outer wall of the diaphragm is greater than the angle of cables in said sleeve portion and said arcuate portion.

6. The spring set forth in claim 1 in which said outer wall portion is substantially cylindrical and has sleeve portions extending inwardly from opposite ends of said outer wall portion and spaced therefrom, said wall portion being about three-fourths as long as the overall length of the cross-section of said diaphragm measured between the ends of said sleeves when said diaphragm is in a relaxed state.

7. The spring set forth in claim 1 comprising a plurality of projections extending radially outwardly from said outer wall portion.

8. The spring set forth in claim 1 in which said outer wall portion, said sleeve portion and said connecting portion are U-shaped in radial section, said connecting portion being capable of flexing and rolling and unrolling without delaminating when bent on a radius of about 10 mm.

9. The spring set forth in claim 1 in which said reinforcement extends throughout the area of said diaphragm.

References Cited

UNITED STATES PATENTS

| | | | |
|---|---|---|---|
| 2,980,571 | 4/1961 | Mosshart et al. | 92—103 X |
| 3,012,546 | 12/1961 | Heintzmann et al. | 92—103 X |
| 3,090,190 | 5/1963 | Boussu et al. | 57—139 |
| 2,143,694 | 1/1939 | Hauvette | 152—356 |
| 3,033,558 | 5/1962 | Slemmons et al. | |
| 3,186,885 | 6/1965 | Iles. | |
| 3,275,096 | 9/1966 | Merell | 152—356 |

FOREIGN PATENTS

| | | |
|---|---|---|
| 978,163 | 3/1950 | France. |
| 1,198,448 | 6/1959 | France. |

MARTIN P. SCHWADRON, *Primary Examiner.*

IRWIN P. COHEN, *Assistant Examiner.*

U.S. Cl. X.R.

267—65